US005868209A

United States Patent [19]

Wierspecker et al.

[11] Patent Number: 5,868,209

[45] Date of Patent: *Feb. 9, 1999

[54] DEVICE FOR COUPLING A TOOL TO HAND-HELD TOOL-DRIVING MACHINE

[75] Inventors: Horst Wierspecker, Leonberg; Heinz Neubert, Ebersbach, both of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 669,343

[22] PCT Filed: Dec. 24, 1994

[86] PCT No.: PCT/DE94/01534

§ 371 Date: Jul. 1, 1996

§ 102(e) Date: Jul. 1, 1996

[87] PCT Pub. No.: WO95/19243

PCT Pub. Date: Jul. 20, 1995

[30] Foreign Application Priority Data

Jan. 14, 1994 [DE] Germany .......................... 44 00 969.0

[51] Int. Cl.$^6$ ...................................................... B23B 51/02

[52] U.S. Cl. .......................... 173/213; 279/19.3; 279/75; 408/226

[58] Field of Search .......................... 173/213; 279/19.3, 279/19.5, 19.6, 75, 905; 408/226

[56] References Cited

U.S. PATENT DOCUMENTS

| | | | |
|---|---|---|---|
| 4,717,292 | 1/1988 | Phillips | 408/226 |
| 5,320,459 | 6/1994 | Kleine | 279/19.3 |
| 5,324,145 | 6/1994 | Kleine | 408/226 |
| 5,340,245 | 8/1994 | Bloechle et al. | 279/19.3 |
| 5,397,203 | 3/1995 | Kleine et al. | 279/19.5 |
| 5,529,444 | 6/1996 | Obermeier | 408/226 |

*Primary Examiner*—Scott A. Smith
*Attorney, Agent, or Firm*—Michael J. Striker

[57] ABSTRACT

A device on hand-held tool-driving machines for the coupling of pounding and/or drilling tools is proposed, comprising at least three couplings and one axial locking feature, which are uniformly distributed over the circumference of the tool shank (11) and seating hole (13) of a tool holder (10). The couplings comprise recesses (17, 19, 21) on the tool shank (11) running axially to the shank end and also projections (18, 20, 22) on the circumference of the seating hole (13) running axially and engaging with the recesses. In order to avoid thrust-like overloads, it is proposed that the coupling (21, 22) in the circumferential area opposite the axial locking feature be designed/shaped such that its recess (21) and projection (22) on at least one longitudinal side run in chord-shaped fashion to the circumference of the tool shank (10) or the seating hole (13) of the tool holder (10) (FIG. 1).

16 Claims, 2 Drawing Sheets

DEVICE FOR COUPLING A TOOL TO HAND-HELD TOOL-DRIVING MACHINE

BACKGROUND OF THE INVENTION

The invention proceeds from a device on hand-held tool-driving machines for coupling pounding and/or drilling tools as well as from a tool and tool holder used with that device.

Such a device is known from EP- 433 876 A1, whereby the trapezoidal or rectangular coupling grooves on the tool shank and the corresponding coupling gibs on the tool holder have a limited wear allowance on their coupling flanks. Particularly in the case of tools having a large working diameter and in the case of powerful machines, the lands between the grooves or the gibs in the seating hole of the tool holder break off. Moreover, the rear flank of the trapezoidal or rectangular coupling grooves is loaded by hard torque thrusts, especially in the case of tilted chiseling work, and this results in notch effects that promote breakage of the gibs on the tool holder and of the lands between the grooves on the tool shank.

Furthermore, a chord-shaped recess on the tool shank is known from DE 42 11 533 A1, a recess which lies opposite an essentially trapezoidal groove for coupling. The chord-shaped recess is used for improvement of compatibility in that a tool shank of such a shape can be inserted in hand-held tool devices having coupling gibs of different widths on their tool holders. Coupling in this case, however, is effected is a very one-sided manner, almost solely on the opposite groove's coupling flank located in the drive direction, since the locking bodies of the tool holder absorb only a slight torque in the locking depressions on the tool shank assigned to them.

SUMMARY

In order to achieve a more uniform torque loading of the tool shank and the tool holder, the device of the invention is designed to have besides at least two couplings lying at least approximately opposite to one another an additional coupling with a chord-shaped end on at least one longitudinal side of the tool shank or the tool holder in the circumferential area that lies at least approximately opposite the axial locking feature. As a result of this solution the wear allowance for the tool holder can be advantageously increased and the notch effect on the tool shank reduced or completely avoided by means of the flat coupling in this area. A further advantage lies in the fact that when such tools are clamped in the borehole, for example, this can also be done with maximum loading in reverse gear in the case of overload coupling having impact-like response.

BRIEF DESCRIPTION OF THE DRAWING

Several embodiments of the invention are represented in the drawing and explained in greater detail in the following description.

PREFERRED DESCRIPTION OF THE EMBODIMENTS

Figure 1:
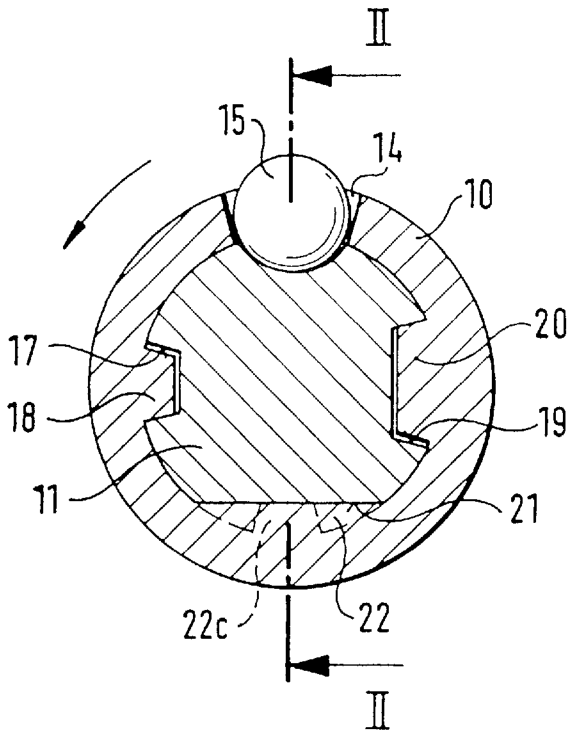
FIG. 1 shows in cross section in an enlarged representation a tool holder for a drilling hammer with the tool inserted.
Figure 2:
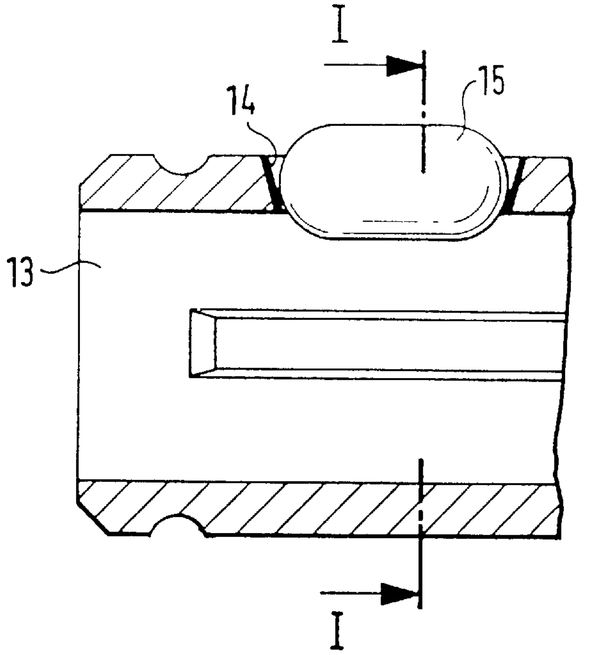
FIG. 2 shows a longitudinal section through the front end of the tool holder per II—II in FIG. 1.

The device on tool-driving machines for coupling pounding and/or drilling tools in accordance with the invention, especially on impact drilling machines and drilling hammers or pounding devices, comprises essentially a tool holder 10 that can be driven in the direction of the arrow and a tool shank 11 inserted in it for a tool 12 used for drilling and/or pounding. A cross section through such a device is shown in FIG. 1 as the first embodiment, in connection with FIGS. 2 and 3. The tool holder whose front end is shown in FIG. 2 in longitudinal section forms the end, in a manner known from WO 88/09245 but not shown, of a hollow-cylindrical, driven tool spindle of a drilling hammer into which a riveting set is mounted such that it is axially movable, which set is pounded cyclically by a pounding mechanism of the drilling hammer against the end of the tool shank 1, which is inserted in the seating hole 13 of the tool holder 10. The tool holder in this case has a radial opening 14 in which a locking body 15 is inserted. When the tool shank 11 is being pushed into the seating hole 13, the running locking locking* body 15, in a manner that is not shown, can be pushed radially toward the outside and drops spring-elastically into a locking depression 16 that is correspondingly machined in the tool shank 11 and runs axially, in order to lock the tool 10 axially by means of a locking bushing. The cylindrically shaped locking body 15 is spherically rounded at its axial ends. The locking depression 16 is shaped as a groove and ends some distance from the back end of the tool shank 11 with a corresponding spherical curvature. On both sides of this axial locking feature formed by the locking body 15 and the locking depression 16, two couplings are located in the opposite areas, whereby one of the couplings comprises a narrow trapezoidal coupling groove 17 in the tool shank 11 that runs axially to the shank end and, engaging with the groove, a coupling gib 18 in the seating hole 13 of the tool holder running axially. The second coupling in the opposite area is formed by a wider coupling groove 19 in the tool shank 11 and a correspondingly wider coupling gib 20 of the tool holder 10 that engages with said coupling groove.

* Translator's Note: The second occurrence of the word "locking" in the original document is presumably a typographical error, whereas there may be a word missing before the word "running."

A third coupling is located in the area opposite the axial locking feature. This coupling is designed such that the tool shank 11 at that location has a chord-like recess 21 (flat spot or section) that runs axially to the shank end, and the tool holder 10, in the corresponding circumferential area of the seating hole 13, has a chord-like projection 22 running axially. This coupling does not have a radial flank for torque transmission like the two other couplings, but rather a substantially larger surface due to the chord-shaped taper ending at the circumference of the tool shank 11 or at the seating hole 13 of the tool holder 10. As a result the surface pressure and therefore the wear in this area is reduced, which has a positive effect, especially on the radial coupling flanks of the other two couplings as well. This is also true in the same way for the rear flanks of the couplings, which can be subjected to thrust stress especially in the case of chiseling work, in which case notch effects on the rectangular or trapezoidal couplings can then bring about damage to the tool shank and/or the tool holder. Because of the chord-shaped end of the third coupling, a flat contact surface between tool shank 11 and tool holder 10 is likewise created, in the case of which no notch effects of any kind occur. This coupling also relieves the two other couplings in the same way as regards notch stress, especially with chiseling work.

Figure 3:
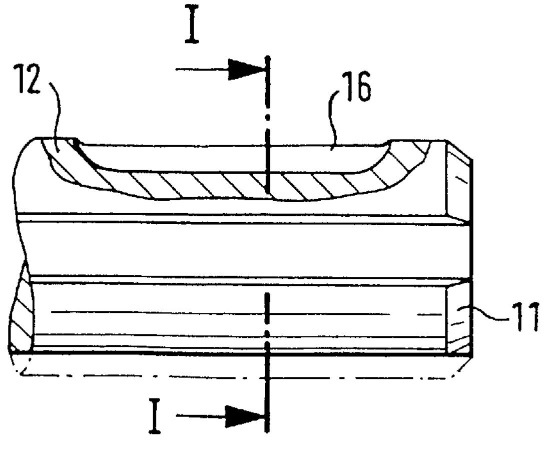
FIG. 3 shows the tool shank. Three additional embodiments of a tool shank designed in accordance with the invention in cross section and the correspondingly designed tool holder are shown in FIGS. 4 and 5, 6 and 7, and 8 and 9.
Figure 4:
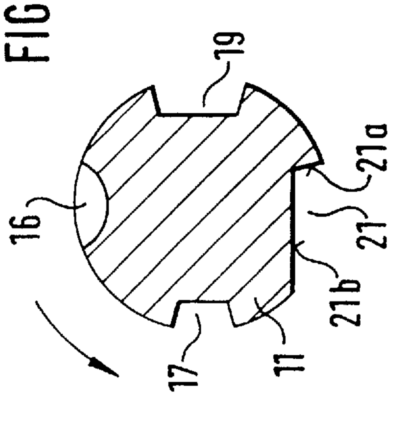
Figure 5:
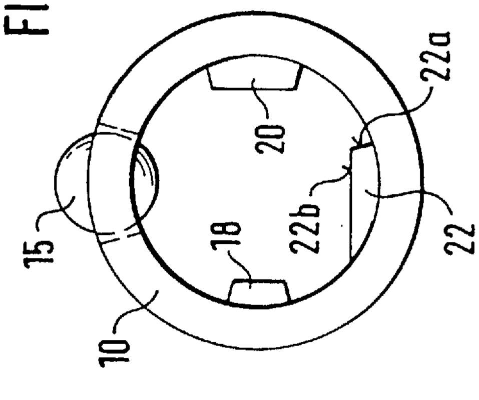

In the second embodiment of a tool shank 11 of a tool holder 10 as shown in FIG. 4 and a tool holder 10 as shown in FIG. 5, the same reference numbers from FIGS. 1 to 3 are used for the same parts. In contrast to the first embodiment, the third coupling located opposite the axial locking feature, comprising the recess 21 on the tool shank 11 and the projection 22 on the tool holder 10, is in this case provided in the drive direction as indicated by the arrow with a flank 21*a*, 22*a* running radially that is used solely for torque transmission in the drive direction. The rear flank of this coupling, in contrast, runs in chord-shaped fashion, as in the first embodiment, to the circumference of the tool shank or to the seating hole 13 of the tool holder 10, in order to absorb dangerous counterclockwise angular momentum impacts, especially in the case of chiseling work with a stationary toolholder.

Figure 6:
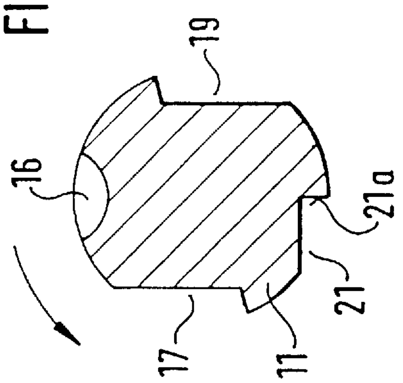
Figure 7:
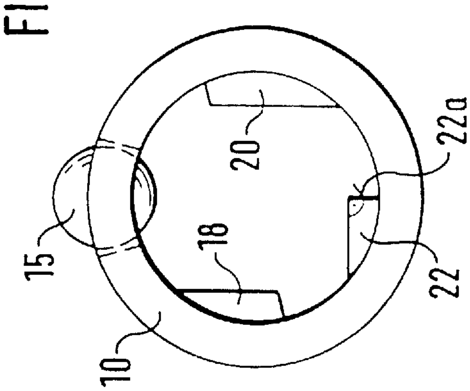

In the third embodiment of a tool shank 11 as shown in FIG. 6 and a tool holder 10 as shown in FIG. 7 the two opposite couplings, which comprise the coupling grooves 17 and 19 and the coupling gibs 187 [Trans. Note: should be 18] and 20, are also designed on the areas facing away from the coupling surfaces such that they run in chord-shaped fashion to the circumference of the tool shank 11 or the seating hole 13. The coupling flank 21*a*, 22*a* of the third coupling 21, 22 is in this case positioned perpendicularly below the axial locking feature 15, 16.

Figure 8:
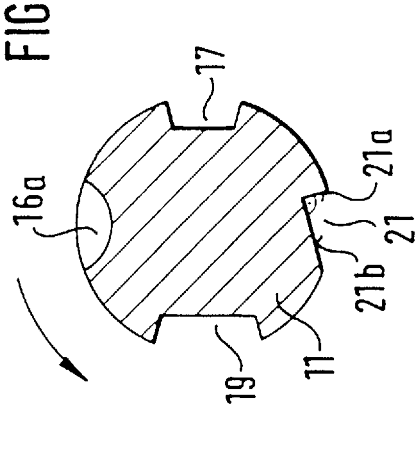
Figure 9:
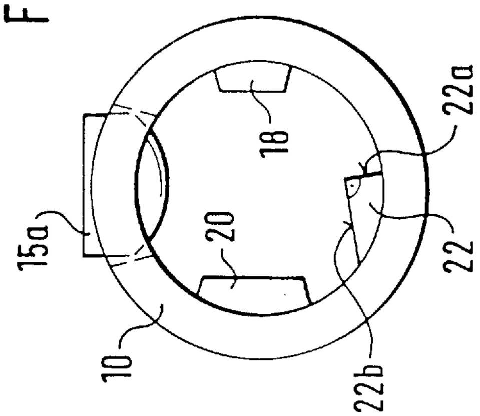

In the fourth embodiment according to FIGS. 8 and 9 a wider axial locking feature, having the locking body 15*a* and the locking depression 16*a* in the tool shank 11 engaging with said body, is shown as an alternative to the foregoing embodiments, and in this case the axial locking feature is offset in the direction of the narrower coupling on the circumference. Moreover in this embodiment the third coupling opposite the axial locking feature is shaped so that its torque-transmitting flank 21*a* forms an angle of at least 90° with the section 21*b* that runs in chord-shaped fashion to the circumference of the tool shank 11. This third coupling is also offset in the circumferential direction in the direction of the narrower coupling 17, 18, in order to obtain the most uniform possible loading on the tool shank 11. In comparison with the first embodiment, the two opposite couplings in this embodiment, which are of different widths, are switched.

The invention is not limited to the embodiments shown, since the number and form, in particular, of individual couplings that are not opposite the axial locking feature can be freely selected. Moreover the chord-shaped coupling in the area opposite the axial locking feature can also be used to improve the compatibility between tool shank and tool holder in that, for example, the tool shank 11 in the embodiment shown in FIG. 1 is inserted into a tool holder having the third coupling gib 22*c* indicated in FIG. 1 by the broken line instead of the projection 22 or into a tool holder 10 as shown in FIG. 5.

What is claimed is:

1. A hand-held tool-driving machine for pounding and drilling, comprising a tool holder having a seating hole; a tool having a tool shank arranged in said seating hole of said tool holder; at least three coupling provided between said tool shank of said tool and said seating hole of said tool holder, said couplings including recesses provided on said tool shank and running axially continuously to said tool shank and axial continuously projections provided on a circumference of said seating hole and engaging with said recesses; axial locking means including a closed depression provided in said tool shank, and a radially displaceable locking body projecting inwardly from said tipping hole and engaging in said closed depression, at least one of said couplings located in a circumferential area opposite to said axial locking means being shaped so that a projection and a recess of said at least one coupling is composed maximum of two sections, and only a section on a lagging longitudinal side of said at least one coupling in direction of rotation runs in a chord-shaped fashion to a circumference of said tool shank of said tool and said seating hole of said tool holder correspondingly.

2. A hand-held tool-driving machine as defined in claim 1, wherein said at least one coupling at least on a longitudinal side lagging in direction of rotation runs in the chord-shape fashion to the circumference.

3. A hand-held tool-driving machine as defined in claim 2, wherein said at least one coupling on a longitudinal side that is leading in the direction of rotation is shaped as a coupling flank running approximately radially.

4. A hand-held tool-driving machine as defined in claim 3, wherein said at least one coupling has a chord-shaped flat section which forms an angle at least 90° with said coupling flank.

5. A hand-held tool-driving machine for pounding drilling, comprising a tool holder having a seating hole; a tool having a tool shank arranged in said seating hole of said tool holder; at least three coupling provided between said tool shank of said tool and said seating hole of said tool holder, said couplings including recesses provided on said tool shank and running axially continuously to said tool shank and axial continuous projections provided on a circumference of said seating hole and engaging with said recesses; axial locking means including a closed depression provided in said tool shank, and a radially displaceable locking body projecting inwardly from said tipping hole and engaging in said closed depression, at least one of said couplings located in a circumferential area opposite to said axial locking means being shaped so that a projection and a recess of said at least one coupling is composed maximum of at least two sections, and only a section on a longitudinal side of said at least one coupling lagging in direction of rotation is formed as a chord which extends axially to the shank end.

6. A hand-held tool-driving machine as defined in claim 5, wherein said projection and said recess of said at least one coupling has a chord-shaped flat section and a coupling flank which directly follow one another.

7. A tool for a hand-held tool-driving machine having a tool holder provided with a seating hole having at least three coupling projections, the tool comprising a tool shank having at least three coupling recesses in which the coupling projections of the tool holder are engageable, said tool shank also having a locking depression engageable with a radially displaceable locking body so as to form axial locking means, at least one of said recesses located in a circumferential area opposite to said locking depressions being composed of maximum two sections, and only a section lagging in direction of rotation running on at least one longitudinal side in a chord-shaped fashion to a circumference of said tool shank.

8. A tool as defined in claim 7, wherein said at least one recess at least on a longitudinal side that lags in a direction of rotation runs in a chord-shaped fashion to the circumference of said tool shank.

9. A tool as defined in claim 8, wherein said at least one recess on a longitudinal side that is leads in the direction of rotation is shaped as a coupling flank running approximately radially, said at least one recess also having a chord-shaped flat section which forms with said coupling flank an angle of at least 90°.

10. A tool for a hand-held tool-driving machine having a tool holder with a seating hole provided with at least three coupling projections, the tool, comprising a tool shank having at least three coupling recesses in which the coupling projections are engageable, said tool shank also having a locking depression engageable with a radially displaceable locking body for an axial locking, at least one of said recesses located in a circumferential area opposite to said locking depression being composed of maximum two sections, and only a section lagging in direction of rotation running on at least one longitudinal side as a chord which extends axially to said shank.

11. A tool as defined in claim 10, wherein said at least one recess has a chord-shaped flat section and a coupling flank directly connected with one another.

12. A tool holder for a hand-held tool driving machine having a tool with a tool shank provided with at least three coupling recesses, said tool holder having a tool holder body with a seating hole which is provided with at least three coupling projections engageable with the coupling recesses of the tool shank; and a locking body for an axial locking, at least one of said projections running axially and located in a circumferential area of said sitting hole which is opposite to said locking body being composed of maximum two sections, and only a section lagging in direction of rotation running in a chord-like fashion on at least one longitudinal side to a circumference of said seating hole.

13. A tool as defined in claim 12, wherein said at least one projection at least on a longitudinal side lagging in a direction of rotation runs in a chord-shaped fashion to the circumference.

14. A tool as defined in claim 12, wherein said at least one projection on a longitudinal side leading in the direction of rotation has a coupling flank running approximately radially and a chord-shaped flat section forming together an angle of at least 90°.

15. A tool holder for a hand-held tool driving machine having a tool with a tool shank provided with at least three coupling recesses, said tool holder having a tool holder body with a seating hole which is provided with at least three coupling projections engageable with the coupling recesses of the tool shank; and a locking body for an axial locking, at least one of said projections being composed of maximum two sections, and only a section legging in direction of rotation running axially and located in a circumferential area of said sitting hole that is opposite said locking body running as a chord-like axially to said shank.

16. A tool as defined in claim 15, wherein said at least one projection has a chord-shaped flat section and a coupling flank directly connected with one another.

* * * * *